United States Patent [19]

Boegel

[11] Patent Number: 5,288,457
[45] Date of Patent: Feb. 22, 1994

[54] COPPER-NICKEL-TIN ALLOY FOR SLIDE BEARINGS

[75] Inventor: Andreas Boegel, Senden, Fed. Rep. of Germany

[73] Assignee: Wieland-Werke AG, Ulm, Fed. Rep. of Germany

[21] Appl. No.: 907,825

[22] Filed: Jul. 2, 1992

[30] Foreign Application Priority Data

Jul. 3, 1991 [DE] Fed. Rep. of Germany ........ 4121994

[51] Int. Cl.$^5$ .............................................. C22C 9/00
[52] U.S. Cl. ..................................... 420/470; 420/485
[58] Field of Search ................................ 420/470, 485

[56] References Cited

U.S. PATENT DOCUMENTS

| | | | |
|---|---|---|---|
| 1,816,509 | 7/1931 | Merriman | 148/501 |
| 2,286,734 | 6/1940 | Harrington | 420/470 |
| 4,732,731 | 3/1988 | Asai et al. | 420/485 |
| 5,021,105 | 6/1991 | Asai et al. | 420/470 |
| 5,132,083 | 7/1992 | Takeda et al. | 420/485 |

OTHER PUBLICATIONS

"High-Strength Cu-Ni-Sn Alloys by Thermomechanical Processing"; Metallurgical Transactions A, vol. 6A, Mar. 1975, 537–544.

*Primary Examiner*—Upendra Roy
*Attorney, Agent, or Firm*—Flynn, Thiel, Boutell & Tanis

[57] ABSTRACT

A slide bearing comprising a copper-nickel-tin alloy consisting essentially of

| |
|---|
| 4–8% by wt nickel, |
| 4–8% by wt tin, |
| 0.005–1.0 by wt zinc, |
| 0.005–0.5 by wt iron, |
| 0.005–1.0 by wt lead, | the remainder being copper and common impurities, the alloy having a multi-phase granular state with a preferred linear orientation and including:

at least one of discontinuous gamma phase precipitations and continuous gamma phase precipitations, the precipitations being formed followed cold forming of the alloy by heat treatment at a temperature of 300° to 450° C. for 10 minutes to 50 hours so as to provide about 0.1 to about 30 volume % of the gamma phase in the alloy, up to 15 volume % of highly concentrated tin and nickel grain areas (GSnNi) characterized by the atomic formula $Cu_{43}Ni_{17}Sn_{40}$, up to 15 volume % of highly concentrated tin and nickel grain areas (GSn) characterized by the atomic formula $Cu_{80}Ni_6Sn_{14}$, a highly concentrated lead-containing phase, and the remainder a mixed copper crystal.

12 Claims, 1 Drawing Sheet

COPPER-NICKEL-TIN ALLOY FOR SLIDE BEARINGS

FIELD OF THE INVENTION

The invention relates to a copper-nickel-tin-alloy having a special granular state, a method for adjusting this granular state and a method of using the alloy.

BACKGROUND OF THE INVENTION

There exists a great need for copper alloys for use as slide beating materials.

The following characteristics are, among others, demanded from a good slide bearing material.

A high resistance to wear, good anti-seizure properties, good low friction properties, a high stress characteristic, a high fatigue strength, a good embedding capability, a good resistance to corrosion and a low tendency to welding.

Tin bronze (for example $Cu_{92}Sn_8$) or special admiralty brass (for example $Cu_{68}Zn_{31}Si_1$, $Cu_{58}Zn_{40}Al_2$) have among others been used so far as a slide bearing material. However, the demands cannot be met with one single material.

Therefore the basic purpose of the invention is to provide a copper alloy, which has a particularly favorable combination of characteristics especially for the mentioned purpose of use.

SUMMARY OF THE INVENTION

The purpose is attained according to the invention by providing a copper-nickel-tin-alloy, which consists of

| | |
|---|---|
| 4–8% | Nickel, |
| 4–8% | Tin, |
| 0.005–1.0% | Zinc, |
| 0.005–0.5% | Iron, |
| 0.005–1.0% | Lead, | the remainder being copper and common impurities (the percentage information refers to weight). The alloy has a multi-phase granular state with the following characteristics:

a) it contains a preferred linear orientation,
b) it contains the following grain elements,
b1) up to 100 volume % of discontinuous precipitations (A),
b2) up to 100 volume % of continuous precipitations,
b3) up to 15 volume % of highly concentrated tin and nickel grin areas (GSnNi), the tin and nickel content of which exceeds at least double the mixed copper crystal composition and can typically be characterized by the summation formula $Cu_{43}Ni_{17}Sn_{40}$,
b4) up to 15 volume of highly concentrated tin grain areas (GSn), the tin content of which exceeds at least double the copper-mixture-crystal composition and can typically be characterized by the summation formula $Cu_{80}Ni_6Sn_{14}$,
5) up to 3 volume % of a highly concentrated lead phase, and
b6) the remainder being a mixed copper crystal.

The preferred linear orientation exists when, at an enlargement by 50 times in a micrograph with a suitable grinding position (longitudinal or transverse grinding or any other desired orientation with respect to the free axes of the sample) for connected grain areas in the image plane, the relationship between the greatest medium lengths and the greatest medium widths is at least 2 or, with the constructed grain, the relationship between the greatest medium grain dimension and the smallest medium grain dimension is at least 2 and the medium directions for at lest two grain areas, which medium directions are determined by the greatest lengths, do not deviate by more than 45°.

The continuous and discontinuous precipitation is based on the formation of a new phase, which is usually identified as the "γ-phase" in literature. (Compare for example the Article "High-Strength Cu-Ni-Sn-Alloys by Thermomechanical Processing" by J. P. Plewes in Met. Trans. A, 6A (1975), Pages 537–544).

The suggested alloy having the granular state of the invention has favorable characteristics with respect to tensile strength $R_m$ (at least 450 MPa), compressive strength $\sigma_{d10}$ (at least 500 MPa), hardness (at least 170 HB), thermal conductivity, and is characterized by having an electric conductivity of at least 7.0 MS/m, as well as a high tool life.

The composition of the copper-nickel-tin-alloy as such is known, for example, from the U.S. Pat. No. 1,816,509, however, the granular state of the invention is not known. Also cast materials of such compositions are suggested for slide bearing uses, however, the importance of adjusting the grain orientation and composition of the invention for the extreme extension of the life times during use as a slide bearing, in particular during loads in the mixed friction field, have up to now not been recognized.

Iron additives in the disclosed amount to the base composition of copper, nickel and tin serve to refine the grain, while the zinc additives favor mainly the formation of $Cu_{43}Ni_{17}Sn_{40}$ and $Cu_{80}Ni_6Sn_{14}$ (grain areas GSnNi and GSn) during solidification.

The presence of the phases, which significantly deviate from the gross composition during the solidification process, are usually interpreted as quality-reducing segregations. In the present case, however, it has been surprisingly found that the segregations, which were maintained due to an incomplete homogenization, form through their increased hardness, additional support parts in the grain structure and positively influence the tool life through the inventive adjustment of the entire grain structure.

Lead additives in the disclosed amount to the base composition are desirous in order to achieve in particular an improvement in the machinability characteristic.

The copper-nickel-tin-alloys of the invention can be processed in the usual manner.

The grain areas GSnNI and GSn are preferably formed during the solidification process.

To adjust the grain areas GSnNi and GSn, it is advisable that when using the continuous casting method the strand is cast while maintaining a medium solidification speed of $v \leq 5$ mm/s. When using the permanent-mold casting, the copper alloy should be fed into a preheated ingot mold in order to hold the mean v under 5 mm/s.

To adjust the discontinuous precipitations (A), it is suggested to subject the alloy after the casting and after carrying out the usual method steps of heating, hot and cold forming following the last cold-forming step for approximately 10 minutes to 50 hours to a heat treatment at a temperature of between 300° and 450° C., with the holding times lying thereby preferably between 2 and 6 hours.

Based on the described advantages, the copper-nickel-tin-alloy is used preferably as a slide bearing material. By adjusting the linearly stretched granular state with differently hard elements, the sliding characteristics, when used as a slide bearing material, are particularly favorably influenced when the sliding direction and preferred direction of the linearly stretched granular state extend approximately perpendicularly to one another. This prevents the erosion of the shaft material, and the construction of microscopic areas with a mostly hydrodynamic lubrication in places of the lines with softer grain parts is strongly favored. Material transfer to the shaft material (welding) is practically completely prevented.

In addition, the anti-seizure properties are improved since, because of the lead additive, a minimum amount of lead oxide formed through tribooxidation is available.

DESCRIPTION OF THE INVENTION

The invention will be discussed in greater detail in connection with the following exemplary embodiment:

EXEMPLARY EMBODIMENT

Case ingots, consisting of 6.1 percentage by weight of nickel, 5.7 percentage by weight of tin, 0.02 percentage by weight of zinc, 0.01 percentage by weight of iron, 0.01 percentage by weight of lead, the remainder being copper and unavoidable impurities, were manufactured by permanent-mold casting and thermally relaxed at 700° C. After machining, the ingots were extruded at 860° C. into pipes with the dimension of 48×4 mm. After cold forming to approximately 40% of a relative transformation to the pipe dimension of 35×3 mm and a three-hour heat treatment at 360° C., preliminary pipes with the following mechanical characteristic were available for the manufacture of slide bearing sleeves:

| Tensile strength | $R_m$ = 670 MPa |
| --- | --- |
| Compressive strength | $\sigma_{d10}$ = 930 MPa |
| Brinell hardness | HB = 260 |

The electric conductivity was 9.0 MS/m.

Figure 1:
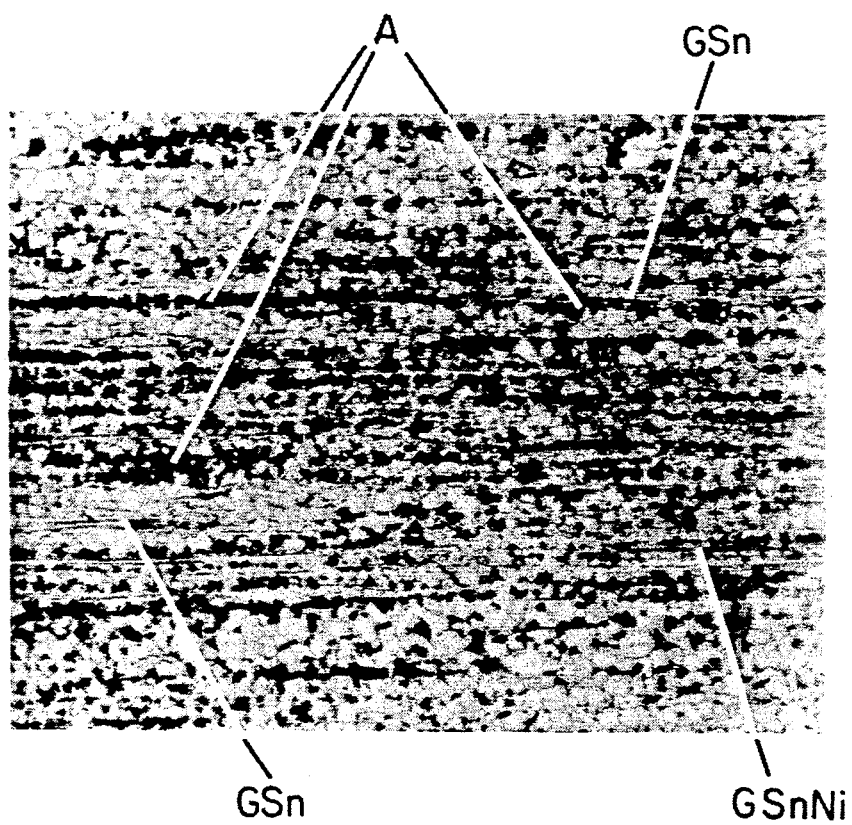
FIG. 1 is a micrograph showing the granular state of an alloy of the present invention.

The micrograph according to FIG. 1 shows in an enlargement of 50:1 the granular state of the invention. The discontinuous precipitations are identified by A and the highly concentrated tin and nickel grain elements are identified by GSnNi and GSn.

The volume parts of the individual grain elements were determined according to the following Table 1.

TABLE 1

| Grain element | Volume part |
| --- | --- |
| A | 25 ± 4 volume % |
| GSnNi | 2 ± 1.5 volume % |
| GSn | 3 ± 2 volume % |
| Lead-containing phase | not detectable |
| Mixed copper crystal | 70 ± 5 volume % |

The preferred linear orientation is clearly visible. The length-width relationship and the tilt angle are listed in Table 2.

TABLE 2

| Grain element | Length-Width Relationship | Angle of tilt relative to the mean main direction* of all grain elements |
| --- | --- | --- |
| A | 6.5:1 | <5° |
| GSnNi | 45:1 | <5° |
| GSn | 60:1 | <5° |
| Mixed copper crystal | 3.6:1 | <5° |

*This mean main direction corresponds in FIG. 1 with the longitudinal edge of the picture.

Figure 2:
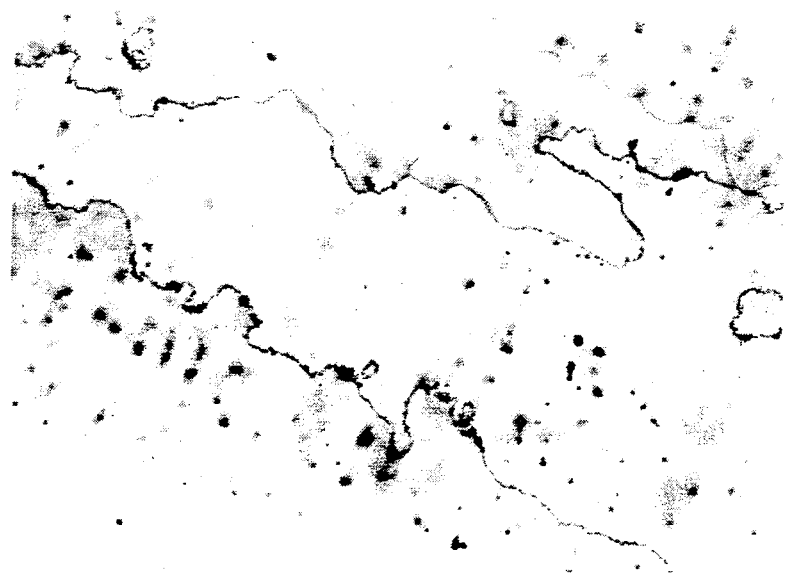
FIG. 2 is a micrograph showing the granular state of a similar prior art alloy.

FIG. 2 shows in comparison the typical granular state of a hardened cast material (HB 250) of a similar composition according to the state of the art (enlargement 200:1).

Sleeves with the dimension of 34×2 mm with a 20 mm width were manufactured by a chip-producing machining from these pipes as a comparison with bearing materials common in the marketplace.

The comparison tests with common slide bearing materials were carried out on a bearing testing machine, in which the slide bearing is moved oscillatorily with respect to a stationary shaft. An adjustable load force can be guided through this shaft by a lever mechanism into the slide bearing to be tested. The load was 33.3 MPa in the present case. 100 changes per minute at an angle of traverse of ±80° occurred. For the initial lubrication, approximately 0.15 g of a lithium-soaped lubricating grease was used, which was not supplemented during the course of the test. The end of the test is reached when seizure in the slide bearing becomes great enough to transmit an increased torque onto the shaft journal causing a turning off of the machine.

The comparison tests were carried out with materials according to the following table:

| Sleeve material | Brinell hardness HB |
| --- | --- |
| $Cu_{68}Zn_{31}Si_1$ | 85 |
| $Cu_{68}Zn_{31}Si_1$ | 142 |
| $Cu_{92}Sn_8$ | 95 |
| $Cu_{92}Sn_8$ | 142 |
| $Cu_{88}Ni_6Sn_6$ | 260 |
| Shaft Materials: | |
| 1. Steel St37 bright: Shaft roughness: | Brinell hardness HB = 216 $R_z$ = 5-20 μm. |
| 2. Ball bearing steel 100Cr6: Shaft roughness: | Rockwell hardness C HRC = 60 $R_z$ = 2-5 μm. |

With the composition $Cu_{88}Ni_6Sn_6$ in the granular state of the invention, using the two above-identified shaft materials compared with the other bearing materials resulted in an increase in the life span of the slide bearing at least by the factor 10 and a reduction of the bearing temperature in the operating phase by approximately 50° C.

What is claimed is:

1. A slide bearing comprising a copper-nickel-tin alloy consisting essentially of 4–8% by wt nickel,
4–8% by wt tin,
0.005–1.0 by wt zinc,
0.005–0.5 by wt iron, -continued 0.005–1.0 by wt lead, the remainder being copper and common impurities, said alloy having a multi-phase granular state with a preferred linear orientation and including:

at least one of discontinuous gamma phase precipitations and continuous gamma phase precipitations, said precipitations being formed followed cold forming of said alloy by heat treatment at a temperature of 300° to 450° C. for 10 minutes to 50 hours so as to provide about 0.1 to about 30 volume % of said gamma phase in said alloy, up to 15 volume % of highly concentrated tin and nickel grain areas (GSnNi) characterized by the atomic formula $Cu_{43}Ni_{17}Sn_{40}$, up to 15 volume % of highly concentrated tin and nickel grain areas (GSn) characterized by the atomic formula $Cu_{80}Ni_6Sn_{14}$, a highly concentrated lead-containing phase, and the remainder a mixed copper crystal.

2. The bearing according to claim 1, wherein the granular state contains 5–30 volume % of said discontinuous precipitations.

3. The bearing according to claim 1, wherein the granular state contains up to 50 volume % of said continuous precipitations.

4. The bearing according to claim 1, wherein the granular state contains up to 5 volume % of the highly concentrated tin and nickel grain areas (GSnNi).

5. The bearing according to claim 1, wherein the granular state contains up to 5 volume % of the highly concentrated tin grain areas (GSn).

6. The bearing according to claim 1, wherein up to half of the nickel content is replaced with cobalt or manganese or a combination of both elements.

7. The bearing according to claim 1, wherein up to half of the tin content is replaced with indium or gallium or a combination of both elements.

8. The bearing according to claim 1, wherein it contains 0.005 to 0.1% phosphorus.

9. The bearing according to claim 1, oriented with its sliding direction approximately perpendicular to said preferred linear orientation.

10. The bearing according to claim 4, wherein the granular state contains up to 1 volume % of the highly concentrated tin and nickel grain areas (GSnNi).

11. The bearing according to claim 5, wherein the granular state contains up to 1 volume % of the highly concentrated tin grain areas (GSn).

12. A copper-nickel-tin alloy consisting essentially of

4–8% by wt nickel,
4–8% by wt tin,
0.005–1.0 by wt zinc,
0.005–0.5 by wt iron,
0.005–1.0 by wt lead, the remainder being copper and common impurities, said alloy having a multi-phase granular state with a preferred linear orientation and including:

at least one of discontinuous gamma phase precipitations and continuous gamma phase precipitations, said precipitations being formed followed cold forming of said alloy by heat treatment at a temperature of 300° to 450° C. for 10 minutes to 50 hours so as to provide about 0.1 to about 30 volume % of said gamma phase in said alloy, up to 15 volume % of highly concentrated tin and nickel grain areas (GSnNi) characterized by the atomic formula $Cu_{43}Ni_{17}Sn_{40}$, up to 15 volume % of highly concentrated tin and nickel grain areas (GSn) characterized by the atomic formula $Cu_{80}Ni_6Sn_{14}$, a highly concentrated lead-containing phase, and the remainder a mixed copper crystal.

* * * * *